United States Patent
Mendez et al.

(10) Patent No.: US 10,069,741 B2
(45) Date of Patent: Sep. 4, 2018

(54) METHOD AND DEVICE FOR LATENCY ADJUSTMENT

(71) Applicant: JACOTI BVBA, Wevelgem (BE)

(72) Inventors: Nun Mendez, Castelldefels (ES); Jacques Kinsbergen, Boechout (BE); Nicolas Wack, Barcelona (ES); Joachim Neumann, Barcelona (ES)

(73) Assignee: JACOTI BVBA, Wevelgem (BE)

( * ) Notice: Subject to any disclaimer, the term of this patent is extended or adjusted under 35 U.S.C. 154(b) by 163 days.

(21) Appl. No.: 14/780,649

(22) PCT Filed: Mar. 27, 2014

(86) PCT No.: PCT/EP2014/056196
§ 371 (c)(1),
(2) Date: Sep. 28, 2015

(87) PCT Pub. No.: WO2014/154822
PCT Pub. Date: Oct. 2, 2014

(65) Prior Publication Data
US 2016/0043957 A1 Feb. 11, 2016

Related U.S. Application Data (60) Provisional application No. 61/907,425, filed on Nov. 22, 2013.

(30) Foreign Application Priority Data

Mar. 27, 2013 (EP) .................................. 13161502

(51) Int. Cl.
*H04L 12/805* (2013.01)
*H04L 21/04* (2006.01)
(Continued)

(52) U.S. Cl.
CPC .......... *H04L 47/25* (2013.01); *H04L 43/0852* (2013.01); *H04L 65/403* (2013.01);
(Continued)

(58) Field of Classification Search
CPC ... H04L 43/0852; H04L 47/25; H04L 65/403; H04L 65/4084; H04L 65/605;
(Continued)

(56) References Cited

U.S. PATENT DOCUMENTS 6,862,298 B1 3/2005 Smith et al.
6,934,752 B1* 8/2005 Gubbi ............... H04L 29/06027
370/392

(Continued)

FOREIGN PATENT DOCUMENTS

EP 2129170 A1 12/2009

OTHER PUBLICATIONS

International Search Report for corresponding International PCT Application No. PCT/EP2014/056196, Aug. 14, 2014.

Primary Examiner — Ayaz Sheikh
Assistant Examiner — Debebe Asefa
(74) Attorney, Agent, or Firm — Workman Nydegger (57) ABSTRACT

A method for outputting from a device having data communication capability received multimedia data with an adjustable latency comprises the steps of: receiving data packets including the multimedia data and storing the multimedia data in a buffer; measuring at least one characteristic indicative of the input rate of the received data packets; measuring a latency introduced by the buffer; obtaining information indicative of the output rate of the device and determining a target latency for the multimedia data to be outputted based on statistical information derived from the measured at least one characteristic indicative of the input rate and the obtained information indicative of the output
(Continued)

rate; adjusting the latency so that it complies with the target latency by modifying the rate at which the multimedia data is outputted or the rate at which the multimedia data is stored in the buffer.

16 Claims, 5 Drawing Sheets

(51) Int. Cl.
    *H04L 12/20*     (2006.01)
    *H04L 29/06*     (2006.01)
    *H04L 12/825*     (2013.01)
    *H04L 12/26*     (2006.01)
    *G10L 21/04*     (2013.01)

(52) U.S. Cl.
    CPC ........ *H04L 65/4084* (2013.01); *H04L 65/605* (2013.01); *H04L 65/80* (2013.01); *G10L 21/04* (2013.01)

(58) Field of Classification Search
    CPC ..... H04L 65/80; H04L 1/0002; H04L 1/0018; H04L 1/1835
    See application file for complete search history.

(56) References Cited

U.S. PATENT DOCUMENTS

| | | | |
|---|---|---|---|
| 8,140,827 B2* | 3/2012 | Liang | ................ G06F 15/17337 712/11 |
| 2007/0220184 A1 | 9/2007 | Tierno | |
| 2011/0205889 A1 | 8/2011 | Chen et al. | |
| 2011/0299588 A1 | 12/2011 | Zhou et al. | |
| 2012/0169588 A1 | 7/2012 | Pasula | |

* cited by examiner

METHOD AND DEVICE FOR LATENCY ADJUSTMENT

FIELD OF THE INVENTION

The present invention is generally related to the field of devices capable of data communication. More in particular, it relates to the field of solutions for dealing with latency in such devices, i.e. with the time interval between the arrival of a stimulus signal in the device and the outputting of a response signal to that stimulus signal.

BACKGROUND OF THE INVENTION

It is well known that large rooms are a challenging environment for acoustic communication. For example, in a typical classroom the distance between the teacher and the students is considerably larger than the typical distance of about 1 to 1.5 meter during a normal one-to-one communication. Therefore, the voice of the teacher is relatively weak at the position of the student. External noise sources as well as the voices or other sounds coming from fellow students add to the acoustics, resulting in a low or even negative signal-to-noise ratio. In addition, the walls of the room add acoustic reverberation to the voice of the teacher, which further reduces its intelligibility.

While the above problems are especially severe for hearing impaired students in a classroom, they are also present outside the classroom, e.g. during a business meeting in a large room, in a room with poor room acoustics or simply because some meeting participants talk or make sounds during a presentation.

Figure 1:
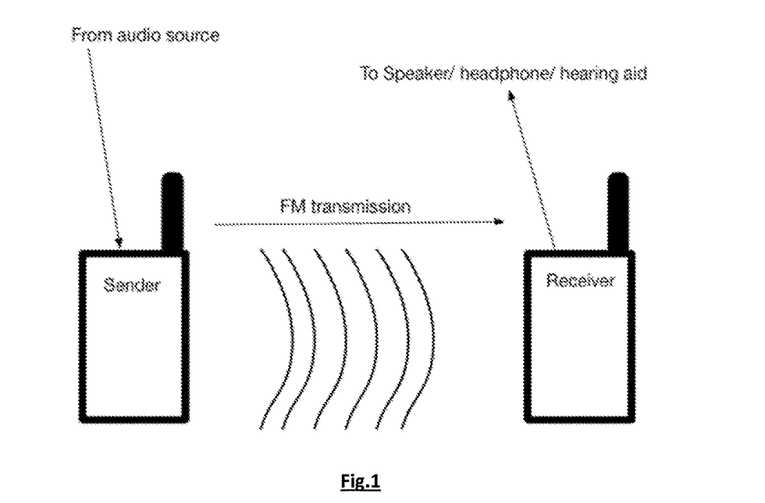
FIG. 1 illustrates a conventional FM system as known in the art.

In the prior art a solution is implemented based on radio transmission of the teacher's voice to the hearing aids of the student. This system is referred to as an "FM system". FIG. 1 provides an illustration. By means of FM wireless transmission, audio data is transferred to a receiver, which then plays the signal to a headphone or hearing aid.

In recent years FM systems have been improved by implementing an estimation of the signal-to-noise ratio in separate frequency regions at the position of the teacher and transmitting this information to the FM receiver in order to improve speech intelligibility by adding gain to the voice of the teacher in frequency regions with more noise energy.

An important limitation of FM systems is that they don't offer a way to change the signal latency. This is especially critical in applications where latency needs to be increased to be in sync with, for example, a video stream. Another important limitation is that FM systems are analog, offering no way at the end point to perform signal error correction, and they are susceptible to interference. Those systems are also unidirectional, making it impossible to transmit back audio from the receiver using the same frequency band.

An important challenge in any digital audio solution is to keep the latency introduced by the digital signal processing as low as possible. The latency of a system is defined as the time difference between the time at which some data is received in the system and the time of which the same data is outputted. The challenge imposed by WiFi technology when it comes to low latency audio, is well known. To our knowledge, no audio-over-network solution available on the market offers an audio latency over WiFi of less than 100 ms. Impairments like jitter, radio mode change or other are very detrimental when it comes to a low latency stream of data.

VoIP solutions can be applied over WiFi to obtain a system capable of streaming real time audio over a local area network. Such systems, however, are generally designed to communicate audio over the Internet and have less restrictions on latency requirements, as they normally interconnect people that do not have direct visual contact because they communicate over larger distance and are not in the same room. Because of the large latency, these systems are not generally suitable for use to transmit audio on a latency-constrained environment such as for communication in the same room.

Similar observations can be made with respect to video data. The importance of low latency can be illustrated for the case of a deaf person who wants to follow a conference at which he is physically present and where an additional video stream is broadcasted to an assistive device (like a smartphone, smartglass, etc.). The same latency-constrained environment occurs in a concert, where the audience receives the audio signal directly from the public address system, but multiple video streams are available for those who want to see on their personal communication devices details of the concert they don't want to miss (for example, a video stream exclusively showing the guitar player, or a video stream that shows only the singer). Obviously it is important in these cases to keep the latency of the video signals under control, preferably as low as possible.

It is increasingly important that such solutions can be run on personal multipurpose devices (such as smartphones or tablets). Those devices are becoming a central point of communication for the users and they serve as a platform for the development of various extra functionalities, just by running software solutions on said devices. The same applies for wireless communication platforms. The importance of running solutions on widespread transport links (such as WiFi 802.11X) is growing, not just from a cost point of view, but also from a convenience point of view. Those devices are also easily serviceable, even from remote locations.

It is important to note that in those devices solutions exist that fulfil the above requirements, but to our knowledge, no solution running on those commodity platforms meets the needs of the described latency-constrained environment. In those environments the dynamic adaptation of the system to the performance available at any particular time suddenly becomes one of the most critical factors to take into account.

EP 2129170 is concerned with a scheme for creating a low latency audio transmission link. In a transmitter a stream of audio samples is coded and transmitted over a synchronous, low latency wireless link. In the receiver the inverse operations like decoding are performed to recover the audio stream. In this way a minimization of transmission latency is achieved while a relatively high audio quality is maintained. The proposed solution may be used for wireless audio transmission from an audio source to a listening device like a hearing instrument, e.g. from an audio source, such as a TV-set, to an intermediate device between the audio source and the listening device.

Application US2012/169588 deals with adjusting for input latency within an electronic device. The electronic device may receive a user input, such as a user actuation of a device key. A latency adjusted time of the input may be calculated based on a latency of the electronic device in determining the user actuation of the device key. The latency adjusted time may be used to determine a result of the user input.

SUMMARY OF THE INVENTION

It is an object of embodiments of the present invention to provide for a method wherein the latency of multimedia data to be outputted by a data communication device is adjustable. It is a further object to provide for a device having the ability to adjust the latency of multimedia data to be outputted.

The above objective is accomplished by the solution according to the present invention.

In a first aspect the invention relates to a method for outputting from a device having data communication capability received multimedia data with an adjustable latency. The method comprises:
  receiving data packets comprising the multimedia data,
  storing said multimedia data in a buffer,
  measuring at least one characteristic indicative of the input rate of the received data packets,
  measuring a latency introduced by the buffer,
  obtaining information indicative of the output rate of the device,
  determining a target latency for the multimedia data stored in the buffer that is to be outputted, based on statistical information derived from the measured at least one characteristic indicative of the input rate and the obtained information indicative of the output rate,
  adjusting the latency introduced by the buffer so that it complies with the target latency by modifying the rate at which said multimedia data is outputted or the rate at which said multimedia data is stored in the buffer.

The proposed solution indeed allows for outputting multimedia data from the communication device with a latency in line with a target value. Received data packets containing the multimedia data are stored in a buffer in the device. The data packets are received at a given, but not necessarily constant, input rate. At least one characteristic yielding an indication of that input rate is measured. A preferred characteristic to derive this information from is the time of arrival of the received data packets or the temporal length of said received data packets. Further, the actual latency introduced by the buffer is measured. Also information concerning the output rate is obtained, by measurement or e.g. from the specifications of the device. All information is then available for adjusting the latency so that it complies with a target latency for said multimedia data. The target latency is based on statistical information derived from the information previously gathered, namely the measured at least one characteristic giving information on the input rate on the one hand and the information on the output rate on the other hand. Next the output rate or the rate at which the input multimedia data is stored in the buffer is adapted, thereby adjusting the additional latency introduced by said buffer to bring it in accordance with the determined target latency.

Preferably the statistical information comprises at least one element of {average input rate, standard deviation of the input rate, a percentile of the input rate}.

In one embodiment the target latency is expressed as a finite set of latency values. Alternatively, the target latency is given as a single value. Also a range of possible values with a minimum and maximum value can be provided.

In a preferred embodiment the data packets further comprise a sample-accurate time stamp, allowing the buffer to be represented as a virtual time line. Advantageously, the method then comprises a step of data gap restoration exploiting the virtual time line. Data gap restoration has the primary advantage of preserving the temporal behaviour of the original multimedia data (by introducing a gap of the same temporal length as the data that has been missing during the transport). More advantageously, these gaps can be filled with forward/backward extrapolations to minimize the negative effect of the lost data.

In another preferred embodiment the method comprises a step of data inference for outputting when said buffer contains not enough data. A preferred method for doing so is forward extrapolation of the past data. Another preferred method involves sampling the past data to match it in the best possible continuous way.

In another embodiment a step is performed of communicating control information to a transmitter adapted for transmitting said data packets. For example, statistical information about the input rate can be sent, so allowing analysis and optimization of this data on the sending side (e.g., by making the temporal length of the data packets larger).

In one embodiment the target latency is also based on at least one element of {data quality, bandwidth, location, distance, power consumption, data type}.

In another embodiment a temporal filtering can be applied to the target latency as determined. One example would be a filter that removes the high frequency content of the variation of such target latency. Another application involves a temporal filtering resulting in more relaxed decreases of said target latency, while increases of said target latencies are left unfiltered.

The invention also relates to a program, executable on a programmable device containing instructions, which when executed, perform the method as previously described.

In another aspect the invention relates to a device having data communication capability, arranged for receiving data packets and comprising
  a buffer for storing multimedia data comprised in said data packets,
  measurement means for measuring at least one characteristic indicative of the input rate of said received data packets and for measuring a latency introduced by said buffer,
  an output for outputting said multimedia data,
  said device further arranged for obtaining information indicative of the output rate of said device and comprising a control logic module adapted for determining a target latency for said multimedia data to be outputted from the buffer based on statistical information derived from said measured at least one characteristic indicative of the input rate and said obtained information indicative of the output rate and adapted for modifying the rate at which said multimedia data is outputted or the rate at which said multimedia data is stored in said buffer in order to adjust said latency introduced by said buffer so that it complies with said target latency.

In one embodiment the device can inform of certain capabilities and requirements to a transmitter. This allows the transmitter to optimize the stream it sends to the receiver. Said capabilities can include, but are not limited to: output rate, output bandwidth, total device latency, etc. On the other hand, the requirements can include, but are not limited to, maximum acceptable total latency, minimum and/or maximum temporal length of the data packets. Further information concerning the type of receiving device that is being used can be conveyed, e.g. an indication of the type of hearing aid or cochlear implant of the user. This can be used advantageously to optimize the sent stream for one or more elements of {power consumption, total latency, data bandwidth, receiving device identification, user identification}.

In another embodiment the device containing the present invention can be a hearing aid or an implantable auditory prosthesis. Those devices are known for their low power consumption needs, as well as their low latency needs. In total implantable devices, all external audio sources need to wirelessly stream the audio signal.

In one embodiment the device according to this invention is a cochlear implant, arranged for receiving a stream of stimulus patterns describing a potential at each electrode.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

The above and other aspects of the invention will be apparent from and elucidated with reference to the embodiment(s) described hereinafter.

BRIEF DESCRIPTION OF THE DRAWINGS

The invention will now be described further, by way of example, with reference to the accompanying drawings, wherein like reference numerals refer to like elements in the various figures.

DETAILED DESCRIPTION OF ILLUSTRATIVE EMBODIMENTS

The present invention will be described with respect to particular embodiments and with reference to certain drawings but the invention is not limited thereto but only by the claims.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

It should be noted that the use of particular terminology when describing certain features or aspects of the invention should not be taken to imply that the terminology is being re-defined herein to be restricted to include any specific characteristics of the features or aspects of the invention with which that terminology is associated.

In the description provided herein, numerous specific details are set forth. However, it is understood that embodiments of the invention may be practiced without these specific details. In other instances, well-known methods, structures and techniques have not been shown in detail in order not to obscure an understanding of this description.

The above-mentioned low latency issue is solved in the present invention by applying an algorithm wherein in a dynamic way the transport link performance is characterised. Based on that performance measure an additional latency range for the buffer is determined so that the received data can be reproduced in a mostly continuous way.

The considered buffer has enough capacity to hold information equivalent to the maximum acceptable latency that can be introduced given the use case. The latency introduced by the buffer is then determined by the time offset between a time $t_0$, where a data packet is introduced to the buffer, and a time $t_1$ where the same data packet is outputted from said buffer.

Figure 2:
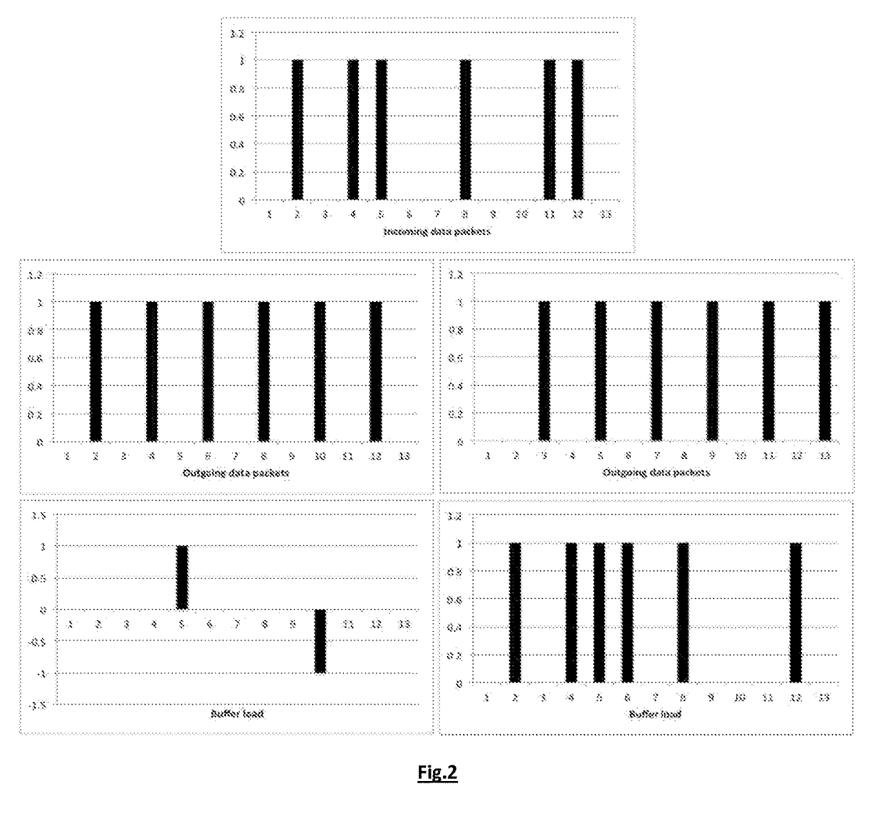
FIG. 2 illustrates the need for buffering in unstable transport links.

The present invention receives digital multimedia data at a given rate from a transport link (for example, using WiFi 802.11X and TCP/UDP) that is intended to be outputted at a different rate. Due to the characteristics of the packets and the transport link, this data might not arrive at a constant rate or might arrive at a rate different from the intended output rate. FIG. 2 illustrates the need for buffering in unstable transport links. The incoming data packets graph plots the time evolution of arrived data packets to a receiver. The input data packet rate is not constant. For example between Time 1 and Time 4, the rate is calculated as 0.5 packets per unit of time, whereas if the calculation is done between Time 7 and Time 10, the rate is 0.25 data packets/unit of time. The outgoing data packets graph shows an output rate necessary to play a continuous stream of data. Two examples are given. In both cases the rate needed is 0.5 data packets/unit of time. Finally, the buffer load graphs show an intermediate storage between received data packets and outgoing data packets. In said buffer load graphs it can be observed that the left one introduces zero latency, which means that the packets are outputted as soon as they arrive. In the left graph one can observe that there is not enough data at time 10 for output. The buffer load graph on the right shows the buffer load for a delayed output reflected on the right outgoing data packets load. In this case it can be seen that there is no shortage of data at any time, thus the system is able to provide a continuous and fixed rate of output without running out of data.

Figure 3:
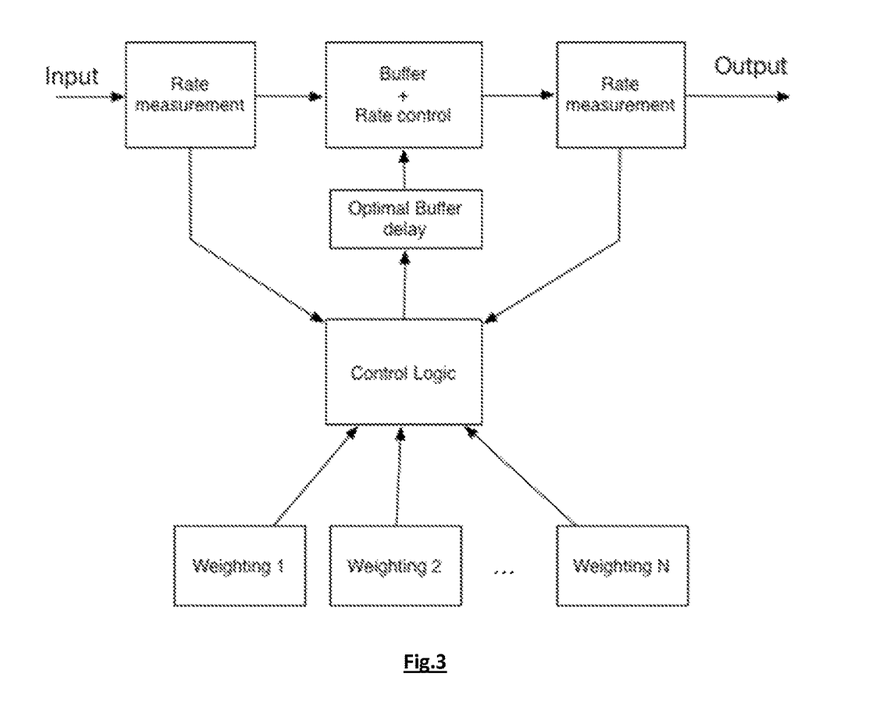
FIG. 3 illustrates a general block scheme of the proposed solution.

A general block scheme of the invention is provided in FIG. 3. The input data rate is measured and then the input multimedia data is inserted into a buffer. The output rate is either measured or characterized. They are used as inputs to a control logic module that calculates an optimal latency to be introduced by the buffer. The calculated optimal latency is the input to the buffer, which adapts the input rate or the output rate to set the introduced buffer latency to said optimal buffer latency.

The control logic module performs a statistical analysis on both the input and the output of the system to have an estimation of the current input and output rates. Based on that information the optimal latency is computed and the buffer is loaded with an optimal amount of data, designed to fulfil the output rate requirement of the system. This is achieved either adding a rate conversion step on either the input side or the output side. As an example, imagine a system where input is given to the buffer once per second and output is requested also once per second. For the sake of the example, consider those periods to be constant in time. Then imagine that at a given point in time, the buffer is loaded with two seconds of data, effectively adding at this time a latency of two seconds. The control logic has calculated that the optimum delay at this point should be one second. A rate conversion built into the buffer output gets the optimal delay value from the control logic and it decides to take said two seconds of buffer data and shrink them to make them an 'accelerated version' that fits in one second, that is changing the output rate from one packet per second to two packets per second. This accelerated version is used then as the output data from the buffer. At this point, the buffer has used two seconds of data on the buffer to output one second of data, thus reducing the latency of the buffer to one second, which is the optimal value calculated by the control logic.

In the case of audio, such rate conversion step can be implemented as a time compression algorithm with no pitch shifting. It can also be implemented as a simple linear interpolation between samples to compensate the difference between the original rate and the target rate.

In the case of video, the rate conversion step can be simply a linear interpolation of the frames, taking into account the original rate and the target rate.

Furthermore, this optimal amount of data can advantageously take into account one or several weighting factors that change the strategy to determine the optimal target latency from said input and output rate measurements. The weighting factors can be, but are not limited to: latency-constrained environment, where weight is put on the minimum latency to achieve a best effort into fulfilling the required output rate while affecting latency as little as possible. Another weighting factor can be a distance measurement either from the transmitter location or from another location such as the public announcement position, which can translate directly into an optimal latency matching the latency introduced by another transport layer (in the case of audio over air the distance is obtained directly by exploiting the velocity of sound of the air, when the clocks of the sender and the receiver are synchronized). Quality weighting can also be used, to optimize the transport layer capacity to allow the system to consume as little resources of it as possible.

Figure 4:
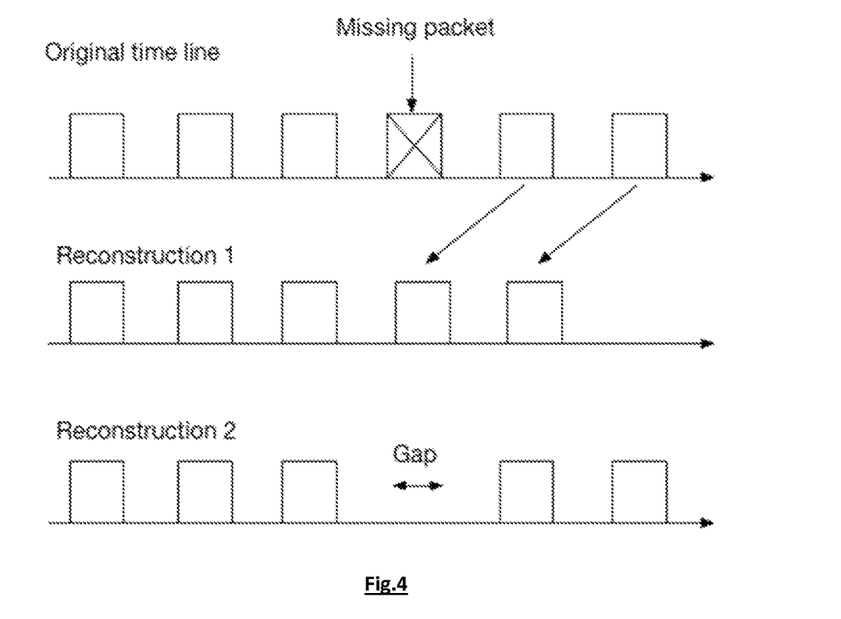
FIG. 4 illustrates the benefit of providing data packets with a time stamp.

In an advantageous embodiment a time stamp is known of each data packet (see FIG. 4). The original time line is shown where a packet is lost during transmission. On reconstruction 1 the next received data packet is inserted right after the last received data packet. In case of data packet loss, this implies that the original time line has been violated. Reconstruction 2 uses time stamps from the data packet to reconstruct the original timeline, thus generating a gap where the packet lost was supposed to be.

Figure 5:
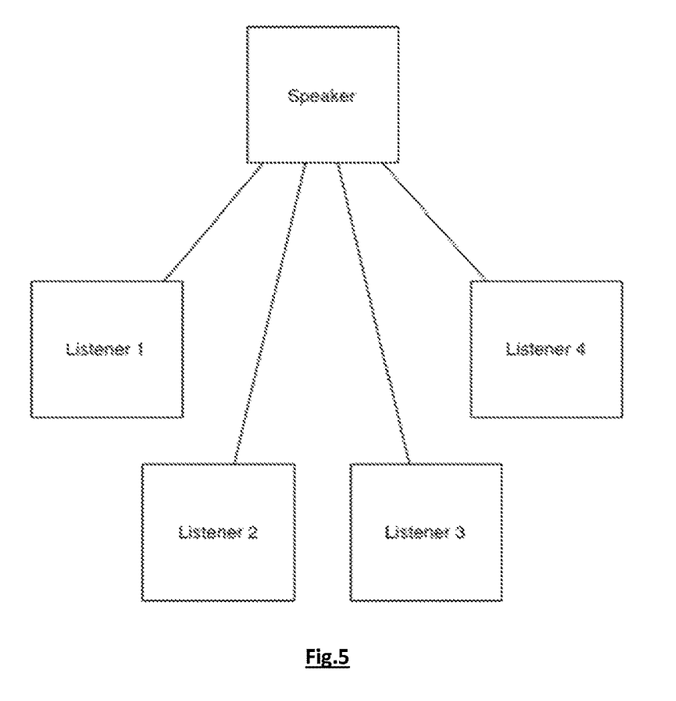
FIG. 5 illustrates an audio transmission system, where a speaker sends an audio signal to every listener.

The present invention can be used to provide assistive audio streams available to listeners in a room. A transmitter can be coupled by means of a computer to a microphone worn by the speaker. This information can be then sent to receivers that implement the present invention. The receivers hear the speaker's voice with the minimum possible latency. FIG. 5 provides an illustration.

Furthermore, the present invention can also be used in a bidirectional way: each transmitter unit may also carry a receiver. This enables a bidirectional data communication system with minimal latency.

Figure 6:
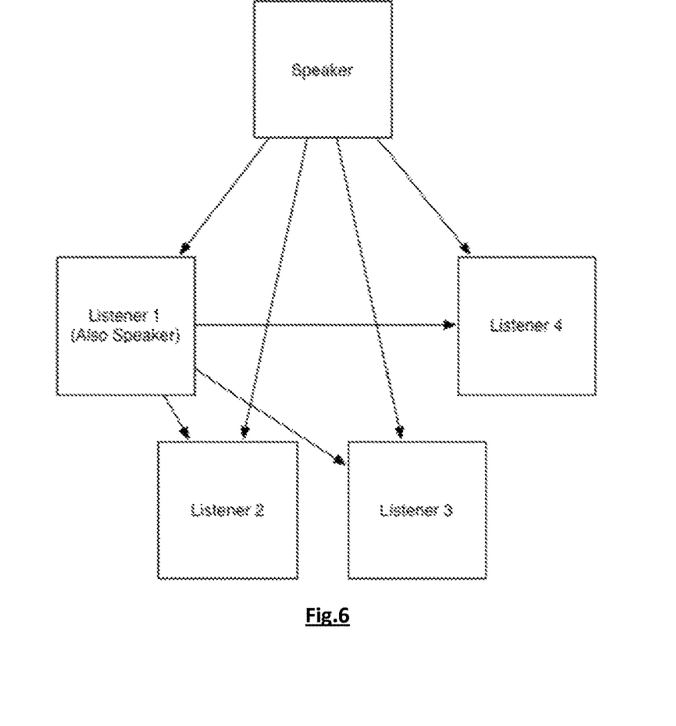
FIG. 6 illustrates an audio transmission system, in which a listener is also speaking.

In some situations a system can carry multiple receivers that implement the present invention, allowing multiple signals from multiple sources to be reproduced at the same time, or reproduced on-demand by the user. FIG. 6 shows an audio transmission system, wherein a listener is also speaking. The main listener signal is transmitted to all listeners, whereas the Listener's 1 voice is transmitted to Listeners 2, 3 and 4.

Figure 7:
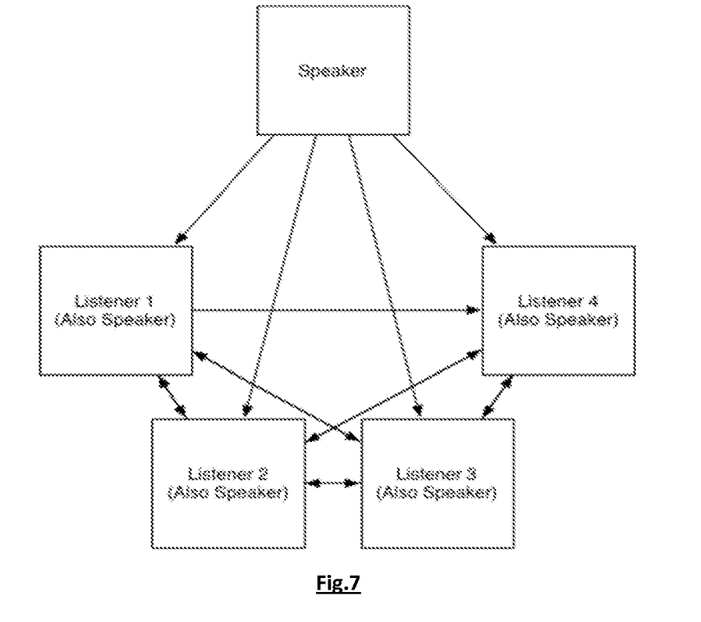
FIG. 7 illustrates an audio transmission system, in which all the listeners also can speak.

In some other situations a set of N devices wherein the present invention is implemented and also a transmitter is available. Then, a central system composed of N transmitters and N receivers can route signals coming from each device to transmit a stream to each of the N devices that is personalized and unique. In the audio transmission system of FIG. 7 all the listeners are also speaking. All the listeners receive the signals from the other listeners, plus the one from the main speaker.

Figure 8:
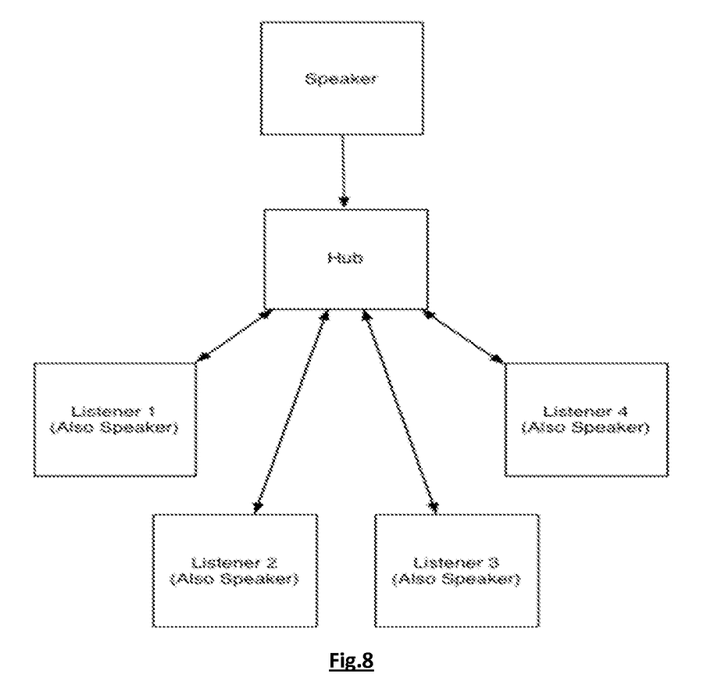
FIG. 8 illustrates an audio transmission system with a hub.

What hereafter is referred to as a 'hub' eases the topology necessary in situations where the receivers need to receive multiple streams from multiple sources. In FIG. 8 a hub is used to minimize the number of transmitted signals through the transport link. All signals come to the hub, which then composes a signal personalized for every listener, and transmits it.

Figure 9:
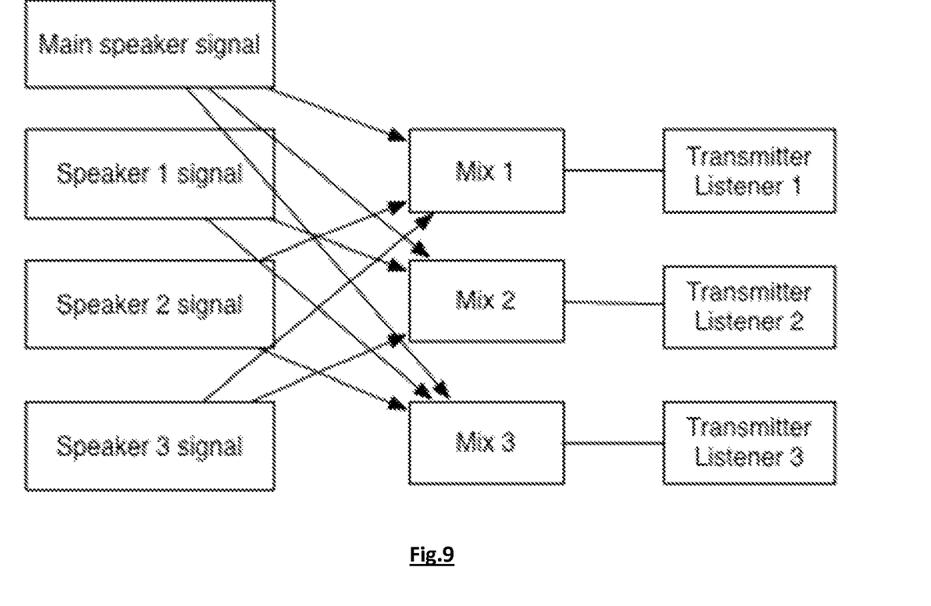
FIG. 9 illustrates a hub with independent mixers.

By way of example the classroom use case is taken. The teacher's voice is captured in the hub and sent to every student's device. Also, workgroups can be created composed of a subset of N students. Every student of this subgroup needs to hear the teacher's voice, plus the voice of every other student that belongs to this subgroup, but should not hear his own voice. This translates into the need for each student to receive N streams (the teacher plus N−1 student's voices). Therefore, in a direct communication, the transport link needs to carry N*N+1 streams, whereas in the hub topology, each stream is sent to the hub, mixed and personalized there, and sent it back to each student. That reduces the number of streams to N+1, which is way lower. This effect increases for larger N. For example if N=5, the number of streams in a non-hub topology would be 26, whereas the hub reduces it to 6. FIG. 9 illustrates all the signals coming to the hub and then independent mixers build a stream that is personalized for every listener.

In some situations, a control signal can be communicated parallel to the data transmission between the transmitter and the receiver. Such control channel allows exchanging information between the transmitter and the receiver. This information can comprise metadata about the data type (in case of audio: music, speech, a mix of them . . . ), complementary information such as captions or signal-to-noise ratio estimates, but also data relevant to the protocol itself, such as average rate of arrival over a period of time, or number of packet lost. The latter can advantageously be used to optimize the data stream.

The control signal can also contain user identification parameters. This information can be then used to personalize the stream sent to the device. For example, a user identification parameter may be the hearing loss. That hearing loss can be used on the transmitter side to compensate the stream of audio before it is sent to the hearing impaired user's receiver.

The data stream of the present invention can be transmitted encoded. This encoding procedure can help reducing the bandwidth of the transport link. In the receiver, a step of decoding is added.

Since the present invention can use commodity hardware, it can record the sound signal that is captured at any of the microphones or the transmitted audio signal for a library of audio signals that can be consulted afterwards.

The data stream of the present invention can be transmitted encrypted, and an extra step of decryption is added on the receiver.

While the invention has been illustrated and described in detail in the drawings and foregoing description, such illustration and description are to be considered illustrative or exemplary and not restrictive. The foregoing description details certain embodiments of the invention. It will be appreciated, however, that no matter how detailed the foregoing appears in text, the invention may be practiced in many ways. The invention is not limited to the disclosed embodiments.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method for outputting, from a device having data communication capability, received audio data with an adjustable latency, the method comprising:
    receiving a data packet comprising said audio data via an unstable transport link,
    storing said audio data in a buffer of said device,
    measuring at least one characteristic indicative of a varying input data packet rate after having received said received data packet via the unstable transport link,
    measuring an actual latency introduced by said buffer,
    obtaining information indicative of the output rate of said device,
    determining a target latency for said audio data to be outputted based on statistical information derived from said measured at least one characteristic indicative of the varying input data packet rate and said obtained information indicative of the output rate, and
    adjusting said actual latency introduced by said buffer so that it complies with said target latency by modifying the rate at which said audio data is outputted or the rate at which said audio data is stored in said buffer.

2. The method for outputting received audio data as in claim 1, wherein said at least one characteristic comprises the time of arrival of said received data packets.

3. The method for outputting received audio data as in claim 1, wherein said statistical information comprises at least one element selected from the group of: average input rate, standard deviation of said input rate, and a percentile of said input rate.

4. The method for outputting received audio data as in claim 1, wherein said target latency is expressed as a finite set of latency values.

5. The method for outputting received audio data as in claim 1, wherein said data packets further comprise a sample-accurate time stamp, allowing said buffer to be represented as a virtual time line.

6. The method for outputting received audio data as in claim 5, comprising a step of data gap restoration exploiting said virtual time line.

7. The method for outputting received audio data as in claim 5, comprising a step of data inference for outputting when said buffer contains not enough data.

8. The method for outputting received audio data as in claim 5, comprising a step of adding extrapolated data.

9. The method for outputting received audio data as in claim 1, wherein a step is performed of communicating control information to a transmitter adapted for transmitting said data packets.

10. The method for outputting received audio data as in claim 1, wherein said target latency is based on at least one element selected from the group of: data quality, bandwidth, location, distance, power consumption, and data type.

11. The method for outputting received audio data as in claim 1, wherein said target latency is determined as a weighted sum.

12. The method for outputting received audio data as in claim 1, wherein a temporal filtering is applied on said target latency.

13. A device having data communication capability, arranged for receiving an audio data packet via an unstable transport link, the device comprising:
    a buffer for storing audio data comprised in said audio data packet, measurement means for measuring at least one characteristic indicative of a varying input data packet rate after having received said packet via the unstable transport link and for measuring an actual latency introduced by said buffer, and an output for outputting said audio data, said device further arranged for obtaining information indicative of the output rate of said device, and said device further comprising a control logic module adapted for determining a target latency for said audio data to be outputted based on statistical information derived from said measured at least one characteristic indicative of the varying input data packet rate and said obtained information indicative of the output rate, and said device being adapted for modifying the rate at which said audio data is outputted or the rate at which said audio data is stored in said buffer in order to adjust said actual latency introduced by said buffer so that it complies with said target latency.

14. The device as in claim 13, arranged for conveying information to a transmitting device, said information allowing adaptation of a audio data stream received by said device having data communication capability.

15. The device as in claim 13, wherein said information to said transmitting device comprises at least one element selected from the group of: output rate, output bandwidth, maximum total latency, temporal length of data packets, power consumption, receiving device identification, and user identification.

16. The device as in claim 15, arranged for receiving at least one element selected from the group of: output rate, output bandwidth, maximum total latency, temporal length of data packets, power consumption, receiving device identification, and user identification; and for adapting at least one transmission parameter according to said at least one received element.

* * * * *